United States Patent [19]

Ranyak

[11] Patent Number: 5,275,148
[45] Date of Patent: Jan. 4, 1994

[54] SOLAR HEAT EXCHANGE SYSTEM

[76] Inventor: Elohim Ranyak, 10114 Woodlake Dr., Dallas, Tex. 75243

[21] Appl. No.: 973,268

[22] Filed: Nov. 9, 1992

[51] Int. Cl.$^5$ ............................................. F24J 2/26
[52] U.S. Cl. ........................................ 126/674; 126/665
[58] Field of Search .............. 126/655, 665, 674, 672, 126/624, 627, 637, 664, 663; 165/171

[56] References Cited

U.S. PATENT DOCUMENTS

| | | | |
|---|---|---|---|
| 4,060,070 | 11/1977 | Harter | 126/663 |
| 4,176,654 | 12/1979 | Zinn et al. | 126/665 |
| 4,290,413 | 9/1981 | Goodman et al. | 126/665 |

FOREIGN PATENT DOCUMENTS 113338  10/1978  Japan ................................. 126/664

*Primary Examiner*—James C. Yeung

[57] ABSTRACT

A solar heat exchange system is disclosed which includes a header or manifold conduit which includes multiple radially disposed apertures therein. A flexible elastomeric mat which includes multiple elongate tubular elements is then mated to the conduit. Each tubular element includes an exterior wall having an octagonal cross-section such that multiple longitudinally disposed flat surfaces are provided, each capable of reflecting non-absorbed solar radiation onto an adjacent tubular element, greatly enhancing the heating efficiency of a solar heat exchange system utilizing this mat. In an alternate embodiment of the mat each tubular element includes an exterior wall having an octagonal cross section and one or more of the upper surfaces of the octagonal cross section include a number of mutually perpendicular facets, such that solar radiation reflected from each facet is reflected onto an adjacent facet.

13 Claims, 2 Drawing Sheets

SOLAR HEAT EXCHANGE SYSTEM

BACKGROUND OF THE INVENTION

1. Field of the Invention

The present invention relates in general to improved solar heat exchange systems and in particular to an improved solar heat exchange system which includes multiple parallel tubular elements. Still more particularly, the present invention relates to an improved solar heat exchange system having multiple parallel tubular elements each having a polygonal cross-section.

2. Description of the Prior Art

The utilization of solar energy to heat water for swimming pools and hydrotherapy tubs, in addition to residential and commercial water heating is well known. Traditionally, solar water heaters have been constructed utilizing metallic components, typically elongate metallic tubing which has been painted black to increase the heat absorption thereof. Such units are typically heavy and highly rigid in nature, expensive to fabricate and maintain and subject to damage as a result of freezing.

Recently, metallic tubes within solar heat exchangers have been replaced by mats of extruded elastomeric tubes which may be pre-colored black by including carbon black within the extrusion material. One example of such a product is described in Scholl, U.S. Pat. No. 3,648,768. Similar heat exchange systems are disclosed in U.S. Pat. No. 3,751,935, issued to MacCracken, U.S. Pat. No. 4,060,070, issued to Harter, and U.S. Pat. No. 4,709,689 issued to Simcox.

In the Scholl patent the elastomeric tubes are prepared for assembly by cutting away webs between the tubes and inserting the tubes onto a manifold. Various methods are then utilized to prevent the tubes from pulling out of the manifold including the utilization of flared screws, springs with tapered collars and heat-shrink end caps. Each of these methods requires the utilization of special tools and special skills.

The utilization of long tubular mats, each having a plurality of parallel tubes, is a clear advance in the solar heat exchange art; however, each of the tubes within such mats generally must be longitudinally separated from each adjacent tube, at least near the end portions, to permit the attaching of the tubes to a manifold. Typically, the tubes within such a mat are spaced by webbing in between the tubes and the webbing is torn manually to loosen the ends of the tube so that they may be connected to associated nipples on a header.

The Simcox patent discloses a technique for enhancing the efficiency of attaching such tubular mats to a manifold by utilizing a tubular header having radial holes bored therethrough and a one piece molded manifold having a base portion which extends over the radial bore within the header and which includes a plurality of radially aligned nipples protruding from the manifold base which may be attached to the tubular mat. Simcox teaches forcing the tubular ends within the mat over the nipples, and then joining all of the tubes on the mat to the manifold thereafter with a single motion. Assembly of the Simcox system is accomplished by applying adhesive to the base of the manifold and header and then aligning the manifold over the bores within the header and applying pressure.

While each of the aforementioned elastomeric mat solar heat exchange systems represents a substantial advance over the metallic elements utilizing in prior art systems, the amount of solar energy which may be obtained from all such mats is substantially identical. Studies within the solar heat exchange art have shown that maximum efficiency in increasing the temperature of water within such mats is achieved by the irradiation of those mats by solar radiation at a particular optimal angle. However, the exigencies of mounting these mats on rooftops or other existing structures often prevents the placement of the mat in a manner which might otherwise maximize the receipt of solar energy. Additionally, the tubular nature of the elements within these mats often acts to reflect solar energy away from the mat, in response to nonoptimal radiation by solar energy.

It should therefore be apparent that a need exists for an improved solar heat exchange system which greatly enhances the efficiency of solar radiation absorption within the elastomeric mat collector.

SUMMARY OF THE INVENTION

It is therefore one object of the present invention to provide an improved solar heat exchange system.

It is another object of the present invention to provide an improved solar heat exchange system which includes multiple parallel tubular elements.

It is yet another object of the present invention to provide an improved solar heat exchange system having multiple parallel tubular elements each having a polygonal cross-section.

The foregoing objects are achieved as is now described. The solar heat exchange system of the present invention includes a header or manifold conduit which includes multiple radially disposed apertures therein. A flexible elastomeric mat which includes multiple elongate tubular elements is then mated to the conduit. Each tubular element includes an exterior wall having an octagonal cross-section such that multiple longitudinally disposed flat surfaces are provided, each capable of reflecting non-absorbed solar radiation onto an adjacent tubular element, greatly enhancing the heating efficiency of a solar heat exchange system utilizing this mat. In an alternate embodiment of the mat each tubular element includes an exterior wall having an octagonal cross section and one or more of the upper surfaces of the octagonal cross section include a number of mutually perpendicular facets, such that solar radiation reflected from each facet is reflected onto an adjacent facet.

Additional objectives, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
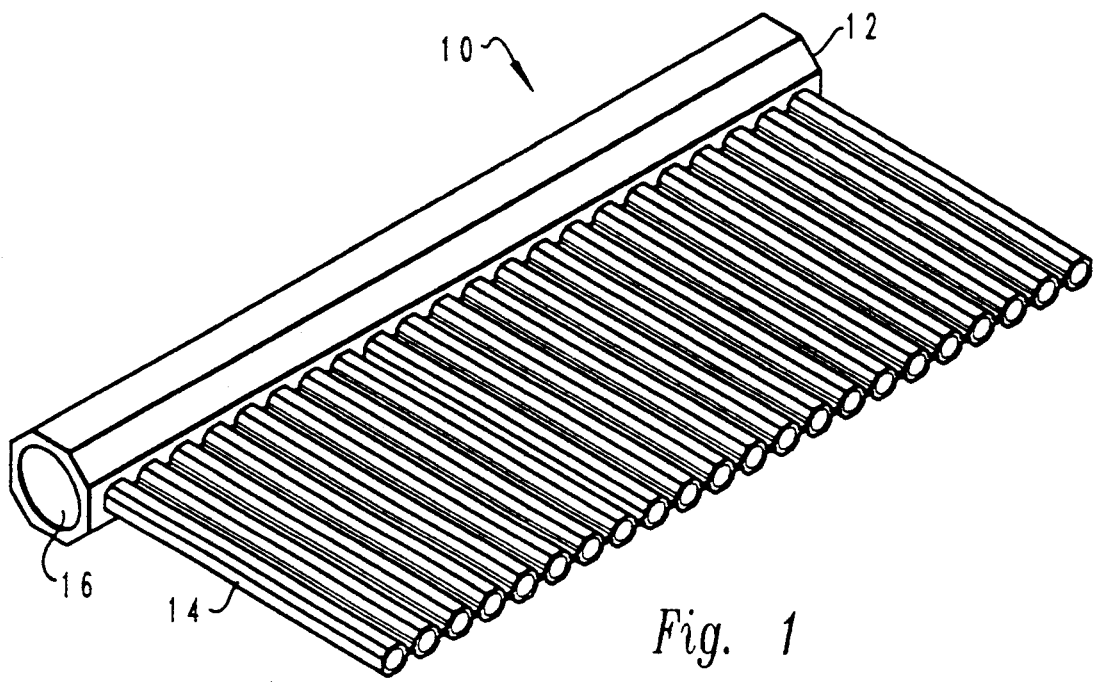
FIG. 1 is a perspective view of a solar heat exchange system constructed in accordance with the present invention.

With reference now to the figures and in particular with reference to FIG. 1 there is depicted a perspective view of a solar heat exchange system 10 which is constructed in accordance with the present invention. As illustrated, solar heating system 10 preferably consists of header conduit 12 and mat 14. As those skilled in the art will appreciate, in a typical installation of a solar heating system, multiple header conduits 12 will be assembled into a larger conduit, each header conduit 12 having assembled thereto a mat 14. As the heating efficiency of solar heating system 10 will increase in direct proportion to the number of square feet of mat 14 which are exposed to solar radiation, the amount of heated water which may be generated utilizing solar heating system 10 may be controlled by controlling the number of header conduits 12 and mats 14 which are assembled into a larger solar heating system. As illustrated, header conduit 12 includes therein a header conduit channel 16 which is utilized to couple water to or from header conduit 12, for flow into or out of the various tubular elements within mat 14.

After constructing a solar heating system 10 utilizing multiple header conduits 12 and mats 14, solar heating system 10 is typically placed on a flat or inclined surface, such as a roof, so that the sun's radiant energy may be absorbed most efficiently by mat 14 as well as by header conduit 12. The length and width of the mat utilized may be determined by the amount of temperature increase which is desired and by the strength and duration of the radiant energy provided by the sun at the installation location.

In the depicted embodiment of the present invention, header conduit 12 is preferably fabricated from a rigid chemically resistant plastic material such as ABS and preferably fabricated utilizing a molding technique. Mat 14, as will be explained in greater detail herein, is preferably constructed utilizing a plurality of flexible tubes which are extruded from a highly flexible elastomer which is resistant to those chemicals typically found within pool or residential water and which exhibits great resistance to breakdown resulting from solar radiation. One example of an excellent elastomer which may be utilized to construct mat 14 is EPDM (ethylene propylene diene monomer). Mat 14 is preferably attached to header conduit 12 utilizing an appropriate adhesive. One appropriate adhesive for bonding mat 14 to header conduit 12 is adhesive A1372-B, manufactured by BF Goodrich. Of course, those skilled in the art will appreciate that other similar materials and adhesives may be utilized.

Figure 2:
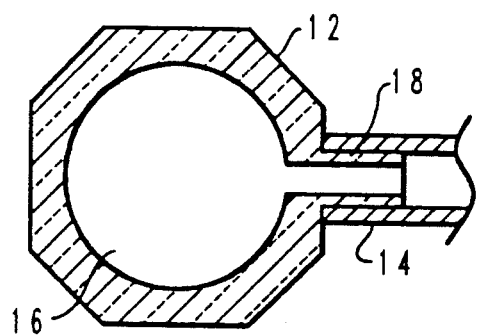
FIG. 2 is a sectional view of a portion of the solar heat exchange system of FIG. 1, illustrating the mating of a conduit and mat.

Referring now to FIG. 2, there is depicted a sectional view of a portion of the solar heat exchange system 10 of FIG. 1, illustrating the mating of header conduit 12 and mat 14. As illustrated within FIGS. 1 and 2, header conduit 12 preferably includes a plurality of radially disposed apertures, such as nipple 18. As is apparent in the sectional view of FIG. 2, header conduit 12 is constructed having an exterior wall having an octagonal cross-section. Of course, those skilled in the art will appreciate that the advantages of the present invention may be obtained by constructing header conduit 12 having an exterior wall with a cross-section which is polygonal in nature having a number of sides which is equal to or greater than four. As illustrated, a plurality of nipples 18 may be disposed along one of the flat surfaces of the exterior wall of header conduit 12 and utilized to couple water or other fluid between heater conduit channel 16 and individual tubular elements within mat 14, in the manner depicted within FIG. 2.

Figure 3:
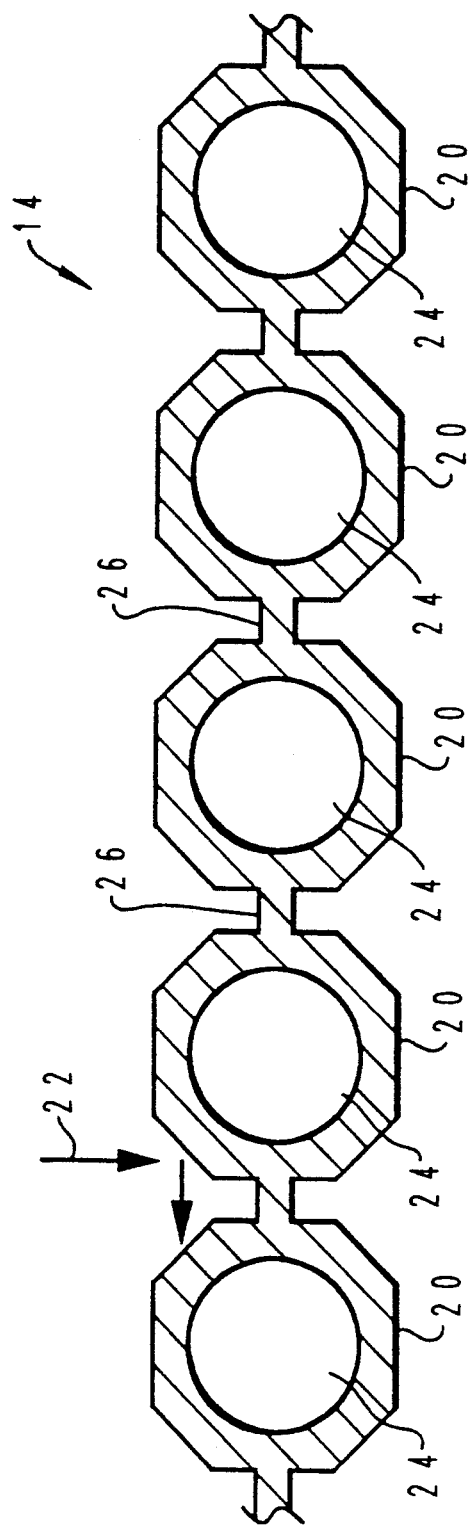
FIG. 3 is a partial sectional view of the solar heat exchange mat utilized with the solar heat exchange system of FIG. 1.

With reference now to FIG. 3, there is depicted a partial sectional view of the solar heat exchange mat utilized within solar heating system 10 of FIG. 1. As will be apparent upon a reference to FIG. 3, an important feature of the present invention is illustrated. Each tubular element 20 within mat 14 preferably includes an exterior surface having a polygonal cross-section. In the depicted embodiment of FIG. 3, each tubular element 20 is octagon shaped; however, as noted above with respect to header conduit 12, any polygon shape may be utilized. By utilizing an octagonal cross-section, such as that depicted within FIG. 3, each tubular element 20 preferably includes a plurality of longitudinally disposed elongate substantially flat exterior surfaces such that solar radiation which is reflected from one surface will be absorbed by an adjacent surface, greatly enhancing the efficiency of the solar heating system. As illustrated at reference numeral 22, solar radiation striking an inclined facet of a tubular element 20 which is not absorbed and utilized to heat fluid within tubular element channel 24 will be reflected to impinge upon an adjacent tubular member, greatly enhancing the efficiency of the solar heating system.

Upon reference to the foregoing those skilled in the art will appreciate that by providing a plurality of parallel tubular elements in the manner depicted within FIG. 3 and by molding or extruding these tubular elements into a polygonal cross-sectional shape, the amount of solar energy which may be absorbed by fluid within tubular element channels 24 may be greatly enhanced, by capturing the solar energy reflected from each facet of the exterior wall which might otherwise be lost. Additionally, as illustrated in FIG. 3, each of the parallel tubular elements depicted therein may be joined by a web element 26. In a preferred embodiment of the present invention, web element 26 is preferably not continuous in nature and tubular elements 20 may thus be simply and easily separated for mating with each nipple 18 within header conduit channel 16. Alternately, by severing one or more web elements 26 adjacent tubular elements 20 may be separated to accommodate protuberances from the mounting surface, such as rooftop vent tubes.

Figure 4:
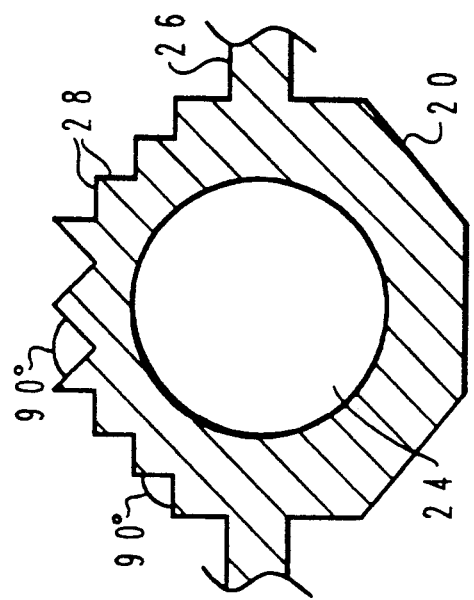
FIG. 4 is an enlarged partial sectional view of an alternate embodiment of the solar heat exchange mat of FIG. 3.

Finally, with reference to FIG. 4, there is depicted an enlarged partial sectional view of an alternate embodiment of the solar heat exchange mat of FIG. 3. As illustrated within FIG. 2, a single tubular element 20 having a generally octagonal shape is depicted. A tubular element channel 24 is also provided, as set forth with respect to FIG. 3, such that fluid may flow within tubular element 20 and be heated by the energy of solar radiation which is received by tubular element 20. In accordance with an important feature of this embodiment of the present invention, three of the upper facets of generally octagonal shaped tubular element 20 include a plurality of mutually perpendicular facets 28. By constructing mat 14 utilizing process which provides mutually perpendicular facets 28, the efficiency of solar heating which may be accomplished utilizing this mat may be greatly enhanced. As will be apparent to those skilled in the art upon reference to the foregoing, solar energy which is reflected from one or more mutually perpendicular facets 28 will be reflected to an adjacent mutually perpendicular facet 28, greatly enhancing the amount of energy which may be absorbed by tubular element 20 over that which may be absorbed utilizing well known and conventional cylindrical tubular elements.

Still referring to FIGS. 3 and 4 it should thus be apparent to those having ordinary skill in the art that by constructing a mat 14 utilizing tubular elements of the type depicted therein, the efficiency of the absorption of solar energy for such a mat may be greatly enhanced by the reflectivity of the facets which are provided by the design of each tubular element within mat 14. Studies have shown that the temperature increase for mats constructed in accordance with the depicted embodiment herein demonstrate an increase of approximately twenty percent over conventional cylindrical tubular elements such as those utilized in the prior art and thus, greater temperature increases may be achieved utilizing a mat having an identical surface area.

While the invention has been shown in only one of its forms, it is not thus limited but is susceptible to various changes and modifications without departing from the spirit thereof.

What is claimed is:

1. A solar heat exchange system comprising:
   a header comprising a conduit having a plurality of radially disposed apertures therein; and
   a mat comprising a plurality of tubular elements each associated with one of said plurality of radially disposed apertures within said conduit, each of said tubular elements including an exterior wall having a generally octagonal cross-section, at least one upper surface of said generally octagonal cross-section of each tubular element including a plurality of mutually perpendicular facets wherein each of said tubular elements includes a plurality of longitudinally disposed elongate substantially flat exterior surfaces such that solar radiation reflected from one of said surfaces may be absorbed by an adjacent elongate tubular member.

2. The solar heat exchange system according to claim 1, wherein said header comprises a generally cylindrical tubular conduit including an exterior wall having a polygonal cross-section wherein said conduit includes a plurality of longitudinally disposed elongate flat surfaces.

3. The solar heat exchange system according to claim 2, wherein said plurality of radially disposed apertures within said conduit comprises a plurality of adjacent radially disposed nipples disposed along one of said longitudinally disposed elongate flat surfaces.

4. The solar heat exchange system according to claim 3, wherein each of said tubular elements is mated to one of said plurality of adjacent radially disposed nipples within said conduit utilizing a liquid adhesive.

5. The solar heat exchange system according to claim 1, wherein said mat is constructed of a chemically resistant flexible elastomer.

6. The solar heat exchange system according to claim 5, wherein said chemically resistant flexible elastomer comprises ethylene propylene diene monomer (EPDM).

7. The solar heat exchange system according to claim 1, wherein said header is constructed of ABS polymer.

8. A solar heat exchange mat comprising:
   a plurality of parallel tubular elements, each of said parallel tubular elements including an exterior wall having a generally octagonal cross-section, at least one upper surface of said generally octagonal cross-section of each tubular element including a plurality of mutually perpendicular facets; and
   web means for joining adjacent ones of said parallel tubular elements.

9. The solar heat exchange mat according to claim 8, wherein said mat is constructed of a chemically resistant flexible elastomer.

10. The solar heat exchange mat according to claim 9, wherein said chemically resistant flexible elastomer comprises ethylene propylene diene monomer (EPDM).

11. A solar heat exchange mat comprising:
    a plurality of parallel tubular elements, each of said parallel tubular elements including an exterior wall having a generally polygonal cross-section, at least one upper surface of said generally polygonal cross-section of each tubular element including a plurality of mutually perpendicular facets; and
    web means for joining adjacent ones of said parallel tubular elements.

12. A solar heat exchange mat according to claim 11, wherein said mat is constructed of a chemically resistant flexible elastomer.

13. A solar heat exchange mat according to claim 12, wherein said chemically resistant flexible elastomer comprises ethylene propylene diene monomer (EPDM).

* * * * *